United States Patent
Zhang

(10) Patent No.: US 9,624,882 B2
(45) Date of Patent: Apr. 18, 2017

(54) ASPIRATOR FOR INTERNAL COMBUSTION ENGINE HAVING INTEGRATED FLOW BYPASS AND CHECK VALVE

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 106 days.

(21) Appl. No.: 14/732,832

(22) Filed: Jun. 8, 2015

(65) Prior Publication Data

US 2016/0356248 A1    Dec. 8, 2016

(51) Int. Cl.
F02M 35/104    (2006.01)
F02M 35/10     (2006.01)
F04F 5/16      (2006.01)

(52) U.S. Cl.
CPC ......... F02M 35/10229 (2013.01); F04F 5/16 (2013.01)

(58) Field of Classification Search
CPC .............................................. F02M 35/10229
USPC ............................. 123/320, 327, 184.53, 389
See application file for complete search history.

(56) References Cited

U.S. PATENT DOCUMENTS

| | | | |
|---|---|---|---|
| 1,820,884 A | 8/1929 | Hueber et al. | |
| 4,380,418 A | 4/1983 | Crawford et al. | |
| 6,035,881 A * | 3/2000 | Emmerich | B60T 17/02 137/113 |
| 6,951,199 B2 * | 10/2005 | Suzuki | B60T 13/46 123/339.11 |
| 8,047,185 B2 | 11/2011 | Ulrey et al. | |
| 8,925,520 B2 * | 1/2015 | Pursifull | F02M 35/10229 123/339.23 |
| 9,227,610 B2 * | 1/2016 | Chahal | B60T 8/4077 |
| 2007/0236083 A1 * | 10/2007 | Kawamori | B60T 13/52 303/114.3 |
| 2013/0340732 A1 | 12/2013 | Pursifull et al. | |
| 2014/0014080 A1 | 1/2014 | Beshay et al. | |
| 2014/0123941 A1 | 5/2014 | Ulrey et al. | |
| 2015/0090355 A1 * | 4/2015 | Fletcher | F16K 31/0668 137/630.12 |
| 2015/0204283 A1 * | 7/2015 | Vanderwege | F02M 35/10144 123/445 |
| 2015/0337867 A1 * | 11/2015 | Costley | F04F 5/24 417/162 |

* cited by examiner

Primary Examiner — Hai Huynh
(74) Attorney, Agent, or Firm — LeClairRyan

(57) ABSTRACT

An aspirator for a brake system is provided having the integrated functions of a flow bypass and a check valve for automotive applications to achieve various suction flow openings in response to different engine operating condition to enhance brake boost performance. The brake system includes a brake vacuum booster, an engine having an intake manifold, an aspirator having a movable total flow divergence nozzle, the aspirator being connected to the manifold, and a vacuum line connecting the booster to the aspirator. The aspirator includes a body having an internal end wall. A biasing element such as a spring is provided between the movable total flow divergence nozzle and the internal end wall of the aspirator body. The body of the aspirator includes an air flow path having an upstream area and a downstream area. The movable motive flow nozzle is positioned in the downstream area of the flow path.

20 Claims, 4 Drawing Sheets

ASPIRATOR FOR INTERNAL COMBUSTION ENGINE HAVING INTEGRATED FLOW BYPASS AND CHECK VALVE

TECHNICAL FIELD

The disclosed inventive concept relates generally to intake manifolds for internal combustion engines. More particularly, the disclosed inventive concept relates to an aspirator having the integrated functions of a flow bypass and a check valve to enhance brake boost performance.

BACKGROUND OF THE INVENTION

Brake systems for vehicles rely on a vacuum brake booster connected to the vehicle's intake manifold. Conventionally positioned between the booster and the manifold is an aspirator that provides a narrow flow introduction gap from the air suction flow to the main flow (the motive flow) that functions at a low vacuum pressure all the way to negative 60 kPa.

Under some engine operation conditions (such as during engine idle), pressure inside the brake boost tank maybe higher than intake manifold. The narrow gap of the aspirator prevents a high flow rate from the boost tank to the intake manifold. Accordingly, a separate flow bypass is required to quickly flow air out of the brake boost tank to achieve desired performance.

The separate flow bypass required by known brake arrangements introduces an additional component that adds cost to the arrangement. In addition, the requirement for the separate flow bypass introduces another element into the vehicle braking system that is subject to failure.

Thus, known brake systems that include aspirators are subject to improvement. Accordingly, a brake system for use with a vehicle that provides an advantage over known systems remains wanting.

SUMMARY OF THE INVENTION

The disclosed inventive concept overcomes the problems associated with known brake boost systems. In general, the disclosed inventive concept provides an aspirator for a brake system having the integrated functions of a flow bypass and a check valve for automotive applications to achieve various suction flow openings in response to different engine operating conditions to enhance brake boost performance.

The disclosed inventive concept provides a brake system for a vehicle that includes a brake vacuum booster, an engine having an intake manifold, an aspirator having a movable total flow divergence nozzle, the aspirator being connected to the manifold, and a vacuum line connecting the booster to the aspirator. The aspirator includes a body having an internal end wall. A biasing element such as a spring is provided between the movable total flow divergence nozzle and the internal end wall of the aspirator body.

The body of the aspirator has an air flow path having an upstream area and a downstream area. The movable motive flow nozzle is positioned in the downstream area of the flow path. The aspirator is connected to the intake manifold at an inlet boss.

The disclosed inventive concept achieves a reduction in production costs by eliminating the bypass flow passage and the associated check valve by providing a sufficient suction flow rate under low vacuum pressure conditions.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

As those of ordinary skill in the art will understand, various features of the embodiments illustrated and described with reference to any one of the figures may be combined with features illustrated in one or more other figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations.

Figure 1:
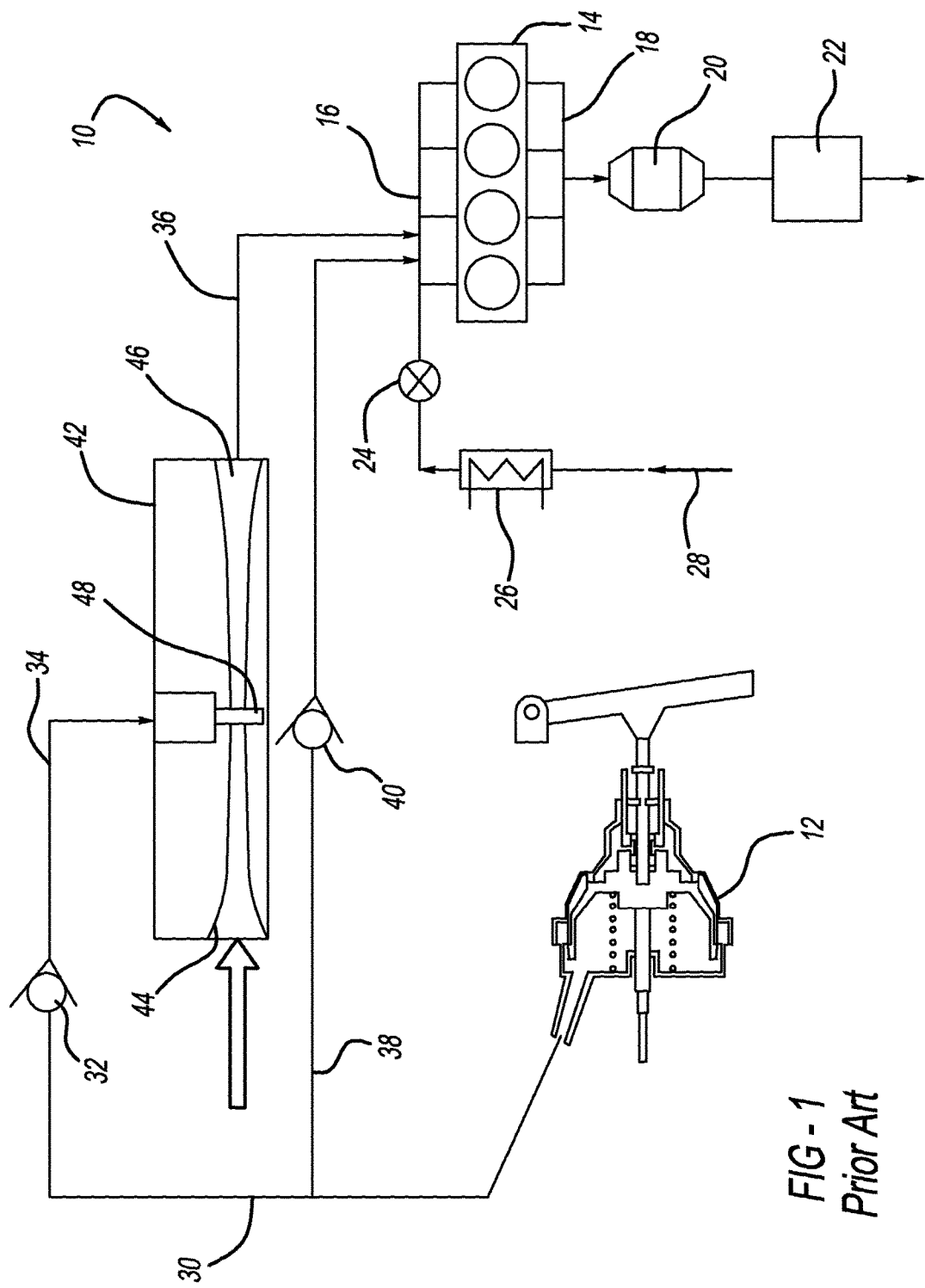
FIG. 1 is a diagrammatic illustration of an existing arrangement of an aspirator in relation to a brake booster and the intake manifold of a vehicle engine.
Figure 2:
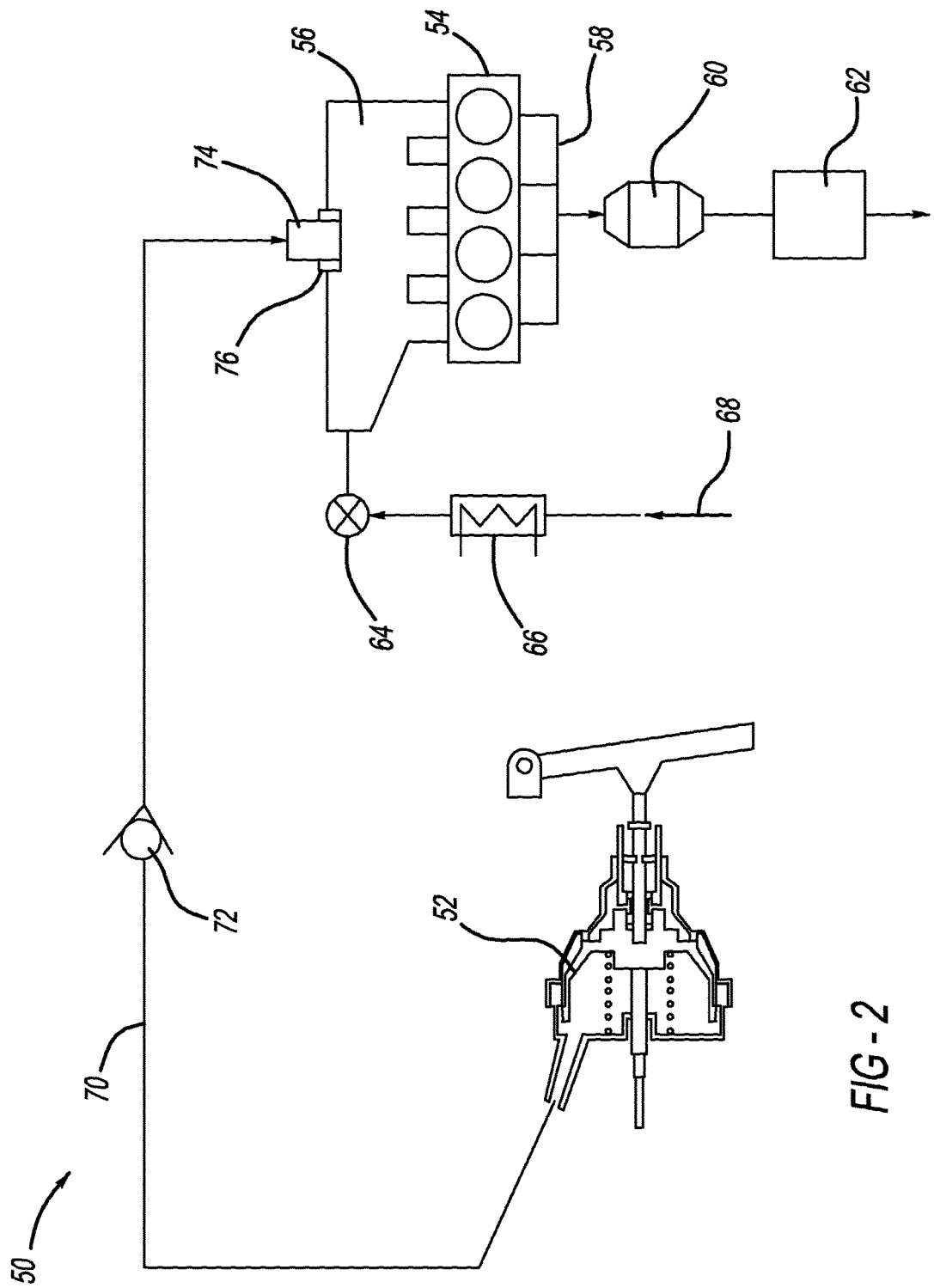
FIG. 2 is a diagrammatic illustration of an arrangement of an aspirator according to the disclosed inventive concept in relation to a brake booster and the intake manifold of a vehicle engine
Figure 3:
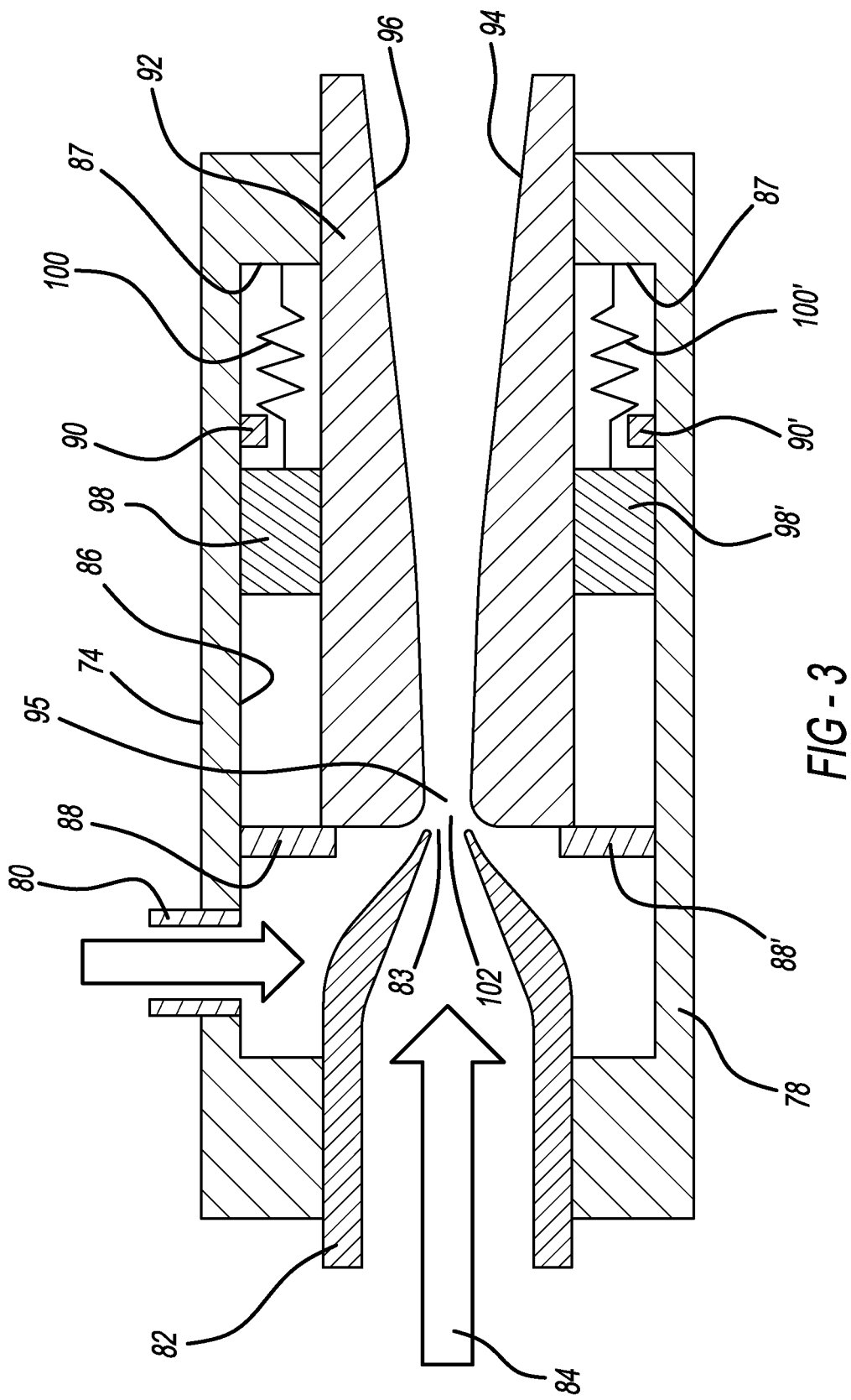
FIG. 3 illustrates a sectional view of an integrated multi-function aspirator according to a first embodiment of the disclosed inventive concept.
Figure 4:
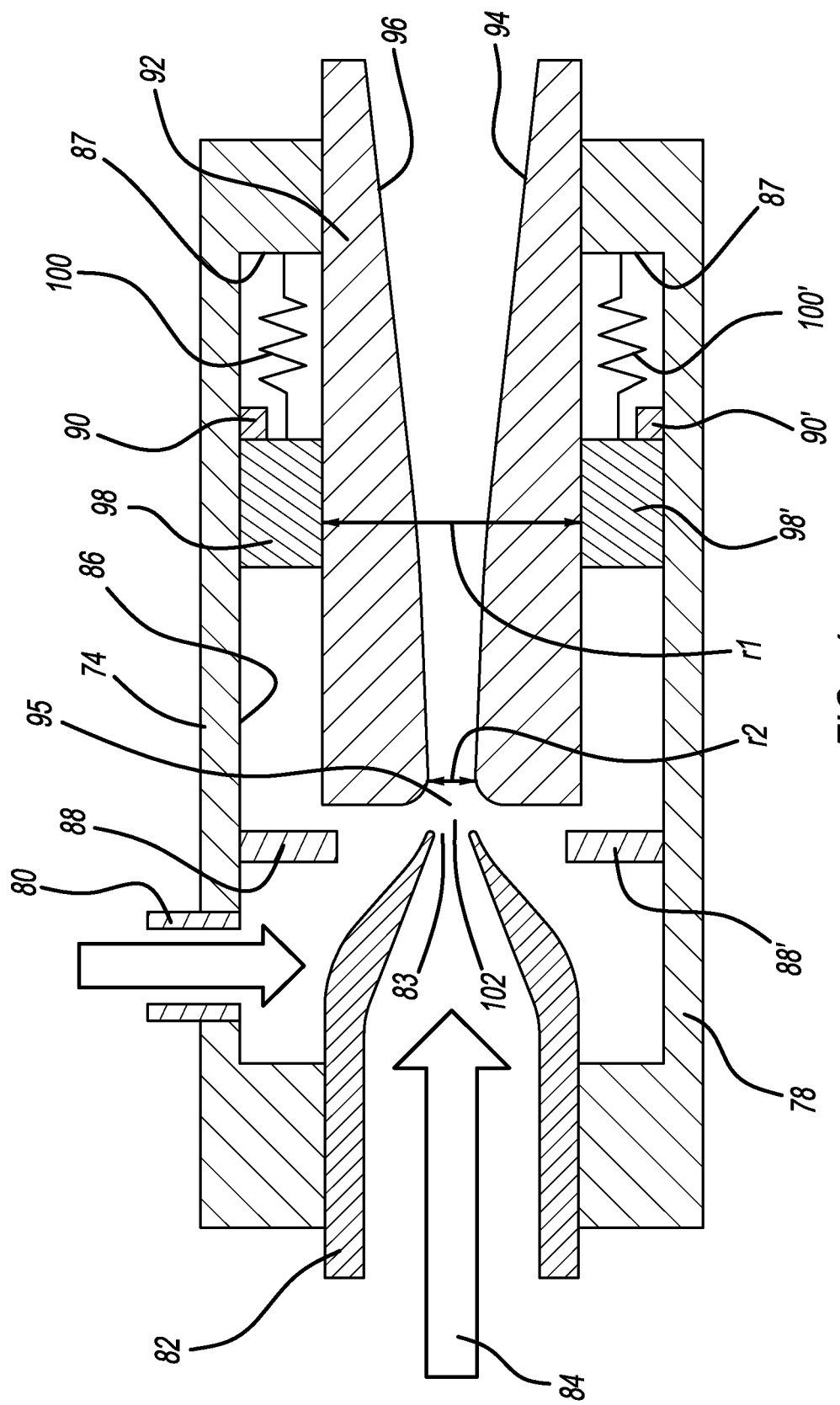
FIG. 4 illustrates a sectional view of an integrated multi-function aspirator according to a second embodiment of the disclosed inventive concept.

FIG. 1 illustrates a traditional and known brake boost system layout while FIGS. 2 through 4 illustrate the brake boost and aspirator according to the disclosed inventive concept. It is to be understood that the arrangement and illustrated shapes of the components of the disclosed inventive concept are suggestive and are not intended as being limiting as other variations of the disclosed inventive concept may be possible without deviating from the spirit and scope of the concept as illustrated, described and claimed.

Referring to FIG. 1, a diagrammatic illustration of an existing arrangement of a brake boost system is shown. The system, generally illustrated as 10, includes a vacuum booster assembly 12, an engine 14 having an intake manifold 16, The engine 14 includes an exhaust manifold 18 associated with a three-way catalytic converter 20 and a muffler 22. The intake manifold 16 is associated with a throttle body 24 and a charge air cooler 26. Ambient air 28 enters the charge air cooler 26 for delivery to the throttle body 24.

Between the vacuum booster assembly 12 and the intake manifold 16 is a flow line 30 having a check valve 32. The flow line 30 includes a booster-to-aspirator portion 34 and an aspirator-to-intake manifold portion 36. Also between the vacuum booster assembly 12 and the intake manifold 16 is a flow bypass line 38 having a check valve 40.

The flow line 30 further includes an aspirator 42. The aspirator 42 includes an aspirator intake end 44 into which ambient, motive flow air enters and an aspirator output end 46. A suction flow introduction gap 48 is formed within the aspirator 42. The suction flow introduction gap 48 is fluidly associated with the booster-to-aspirator portion 34 of the flow line 30. The suction flow introduction gap 48 is also fluidly disposed between the aspirator intake end 44 and the aspirator output end 46.

Referring to FIG. 2, a diagrammatic illustration of a brake boost system incorporating the aspirator design according to the disclosed inventive concept is illustrated. The system, generally illustrated as 50, includes an engine 54 having an intake manifold 56. The engine 54 includes an exhaust manifold 58 associated with a three-way catalytic converter 60 and a muffler 62. The intake manifold 56 is associated with a throttle body 64 and a charge air cooler 66. Ambient air 68 enters the charge air cooler 66 for delivery to the throttle body 64.

Between the vacuum booster assembly 52 and the intake manifold 56 is a flow line 70 having a check valve 72. An aspirator 74 having integrated flow bypass and check valve functions according to the disclosed inventive concept is attached to the intake manifold 56 by a mounting boss 76 attached to the intake manifold 56 by, for example, welding. The aspirator 74 according to the disclosed inventive concept avoids the need for a separate flow bypass line as is known in the art and as is discussed above in relation to the prior art illustrated in FIG. 1.

FIGS. 3 and 4 illustrate in section views the aspirator 74 under different operating conditions. Particularly, the aspirator 74 illustrated in FIG. 3 is shown under positive $\Delta p$ while the aspirator 74 illustrated in FIG. 4 is shown under negative $\Delta p$. As is understood, $\Delta p = p_{Map} - p_{vacuum}$.

Referring to FIG. 3, the aspirator 74 includes an aspirator body 78 having a vacuum inlet 80 as the vacuum inlet that is attached to the vacuum booster assembly 52 by the flow line 70. The vacuum inlet 80 provides the vacuum suction flow ($p_{vacuum}$) to the aspirator 74. The aspirator body 78 further includes a motive flow nozzle 82 into which a stream of ambient air 84 flows. The motive flow nozzle 82 includes a narrowed outlet 83. An air filter (not shown) is attached to the motive flow nozzle 82. The motive flow nozzle 82 is located in the upstream area of the aspirator body 78.

Formed within the aspirator body 78 is an axial bore 86 having an end wall 87. A first stopper arrangement is provided and is illustrated as stoppers 88 and 88'. A second stopper arrangement is provided and is illustrated as stoppers 90 and 90'. The stoppers 88, 88', 90 and 90' may be of any configuration, such as a ring.

Movably disposed within the axial bore 86 is a total flow divergence nozzle 92 that includes a central bore 94 having a narrow inlet 95 and a conical outlet 96. The total flow divergence nozzle 92 includes a radially formed shoulder arrangement illustrated as shoulders 98 and 98'. Disposed between the end wall 87 of the axial bore 86 and the shoulders 98 and 98' is a pair of pre-loaded biasing elements 100 and 100' illustrated as being in the form of springs, although other biasing elements would be suitable as well. The total flow divergence nozzle 92 is located in the downstream area of the aspirator body 78 while the biasing elements 100 and 100' urge the total flow divergence nozzle 92 in the upstream direction.

Under regular engine and brake boost operating conditions where positive $\Delta p$ exists as illustrated in FIG. 3, the pressure inside the vacuum booster assembly 52 is lower than the pressure inside of the intake manifold 56. Accordingly, pressure force between the downstream and upstream areas of the total flow divergence nozzle 92, as well as the force of the biasing elements 100 and 100', work in the same direction and push the total flow divergence nozzle 92 upstream until its movement is halted by the stoppers 88, 88'.

In such a condition, the total flow divergence nozzle 92 is positioned such that a gap 102 formed between the narrowed outlet 83 of the motive flow nozzle 82 and the narrow inlet 95 of the total flow divergence nozzle 92 for suction flow is minimized and the primary air flow enters the central bore 94 of the total flow divergence nozzle 92 as the ambient air 84 entering the motive flow nozzle 82. The vacuum suction flow from the vacuum inlet 80 is minimized. The restricted gap between the narrow outlet 83 of the motive flow nozzle 82 and the narrow inlet 95 of the total flow divergence nozzle 92 provides a very low pressure for the vacuum booster assembly 52.

However, during other engine operating conditions such under conditions of very low pressure in the intake manifold 56, a negative $\Delta p$ results as illustrated in FIG. 4. In such a situation, the pressure difference between the upstream and downstream sides of the total flow divergence nozzle 92 creates a higher force than that of the biasing elements 100 and 100' which are now overcome by the increased suction at the air vacuum inlet 80. As a result, the total flow divergence nozzle 92 is moved downstream and axially away from the motive flow nozzle 82 until its movement is halted by the stoppers 90 and 90'. In this position, the gap 102 formed between the narrow outlet 83 of the motive flow nozzle 82 and the narrow inlet 95 of the total flow divergence nozzle 92 for suction flow is increased as shown in FIG. 4. As a result, larger suction flow through the greater gap 102 formed between the narrowed outlet 83 of the motive flow nozzle 82 and the narrow inlet 95 of the total flow divergence nozzle 92 provides a much higher suction flow rate and makes it possible to eliminate the separate flow bypass.

By way of a non-limiting example, and referring to FIG. 4, for $\Delta p = 5000$ (N/m$^2$) where r1=12 mm (the radius r1 defines the radius of the total flow divergence nozzle 92), r2=4 mm (the radius r2 defines the radius of the narrow inlet 95), and F=2. Other values are possible without deviating from the disclosed inventive concept.

The disclosed invention as set forth above overcomes the challenges faced by known brake boost systems by eliminating the need for an additional bypass line. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A brake system for a vehicle comprising:
   a brake vacuum booster;
   an engine having an intake manifold;
   an aspirator having a movable flow divergence nozzle, said aspirator being connected to said manifold; and
   a vacuum line connecting said booster to said aspirator.

2. The brake system for a vehicle of claim 1 wherein said aspirator has an air flow path, said path having an upstream area and a downstream area, said aspirator further including a motive flow nozzle positioned in said upstream area of said flow path.

3. The brake system for a vehicle of claim 2 where said divergence nozzle is positioned in said downstream area of said aspirator.

4. The brake system for a vehicle of claim 1 wherein said aspirator has a body, said body connecting said motive flow nozzle and said divergence nozzle.

5. The brake system for a vehicle of claim 4 further including a biasing element positioned between said divergence nozzle and said body.

6. The brake system for a vehicle of claim 5 wherein said biasing element is a spring.

7. The brake system for a vehicle of claim 1 wherein said aspirator further includes an inlet boss to attach said aspirator to said intake manifold.

8. An aspirator for use in a vehicle brake control system having a brake booster and an intake manifold, said aspirator comprising:
   a body;
   an ambient air inlet formed in said body;
   a vacuum line inlet formed in said body;
   an intake manifold attachment port formed in said body; and
   a movable flow divergence nozzle positioned in said body.

9. The aspirator for use in a vehicle brake control system of claim 8 wherein said body has an axial bore.

10. The aspirator for use in a vehicle brake control system of claim 9 wherein said movable flow divergence nozzle is positioned in said axial bore.

11. The aspirator for use in a vehicle brake control system of claim 9 wherein said divergence nozzle has a conically-shaped bore.

12. The aspirator for use in a vehicle brake control system of claim 9 wherein said axial bore of said body has an end wall, the aspirator further including a biasing element positioned between said end wall and said movable flow divergence nozzle.

13. The aspirator for use in a vehicle brake control system of claim 12 wherein said biasing element is a spring.

14. The aspirator for use in a vehicle brake control system of claim 9 wherein said bore has first and second spaced apart nozzle movement-limiting shoulders.

15. The aspirator for use in a vehicle brake control system of claim 8 wherein said body has a side wall and wherein said vacuum line inlet is formed in said side wall.

16. An integrated aspirator assembly for a vehicle comprising:
   a brake vacuum booster;
   an engine having an intake manifold;
   a flow path between said booster and said manifold;
   an aspirator positioned ins aid flow path, said aspirator including a downstream area; and
   a flow divergence nozzle movably position in said downstream area.

17. The integrated aspirator assembly for a vehicle of claim 16 wherein said aspirator includes an upstream area and a motive flow nozzle positioned in said upstream area.

18. The integrated aspirator assembly for a vehicle of claim 16 wherein said aspirator includes a body, said body having an end wall.

19. The integrated aspirator assembly for a vehicle of claim 18 further including a biasing element positioned between said flow divergence nozzle and said end wall.

20. The integrated aspirator assembly for a vehicle of claim 16 wherein said body includes an inlet and wherein a portion of said inlet has a conically-shaped bore and wherein said divergence nozzle has a conically-shaped bore.

* * * * *